United States Patent
Moore

(10) Patent No.: US 7,482,812 B2
(45) Date of Patent: Jan. 27, 2009

(54) SERIES-RESONANT TUNING OF AN LWD RECEIVER

(75) Inventor: Robert A Moore, Katy, TX (US)

(73) Assignee: PathFinder Energy Services, Inc., Houston, TX (US)

( * ) Notice: Subject to any disclaimer, the term of this patent is extended or adjusted under 35 U.S.C. 154(b) by 0 days.

(21) Appl. No.: 11/405,378

(22) Filed: Apr. 17, 2006

(65) Prior Publication Data

US 2006/0181281 A1 Aug. 17, 2006

Related U.S. Application Data

(62) Division of application No. 10/427,899, filed on May 1, 2003.

(51) Int. Cl.
*G01V 3/00* (2006.01)
*H01Q 1/04* (2006.01)

(52) U.S. Cl. ...................... 324/338; 343/719

(58) Field of Classification Search .............. 340/854.6; 343/719, 741, 745, 744; 324/341, 335, 303, 324/338, 332, 333, 334, 336, 337, 339, 340, 324/342, 343, 344; 333/64, 175
See application file for complete search history.

(56) References Cited

U.S. PATENT DOCUMENTS

| | | | |
|---|---|---|---|
| 2,898,590 A * | 8/1959 | Pichitino | .................... 343/722 |
| 3,551,797 A | 12/1970 | Gouilloud et al. | |
| 3,657,659 A | 4/1972 | Johnson | |
| 3,760,270 A | 9/1973 | Irvin | |
| 3,891,916 A | 6/1975 | Meador et al. | |
| 3,893,021 A | 7/1975 | Meador et al. | |
| 3,906,361 A | 9/1975 | Nessler et al. | |
| 3,944,910 A | 3/1976 | Rau | |
| 4,012,689 A | 3/1977 | Cox et al. | |
| 4,107,597 A | 8/1978 | Meador et al. | |
| 4,107,598 A | 8/1978 | Meador et al. | |
| 4,185,238 A | 1/1980 | Huchital et al. | |
| 4,209,747 A | 6/1980 | Huchital | |
| 4,258,321 A * | 3/1981 | Neale, Jr. | ..................... 324/334 |
| 4,278,941 A | 7/1981 | Freedman | |
| 4,401,947 A | 8/1983 | Cox | |
| 4,451,789 A | 5/1984 | Meador | |
| 4,461,997 A | 7/1984 | Ohmer | |
| 4,538,109 A | 8/1985 | Clark | |
| 4,547,733 A | 10/1985 | Thoraval | |
| 4,553,097 A | 11/1985 | Clark | |
| 4,622,518 A | 11/1986 | Cox et al. | |
| 4,652,828 A | 3/1987 | Kenyon et al. | |
| 4,692,706 A | 9/1987 | Mazzagatti et al. | |

(Continued)

*Primary Examiner*—Patrick J Assouad
*Assistant Examiner*—David M. Schindler

(57) ABSTRACT

A loop antenna useful, for example, in investigation of earth formations. Embodiments of the invention provide a loop antenna circuit comprising a loop antenna disposed to generate, in response to an electromagnetic wave, a pick-up signal on an output node. Loop antenna circuit further includes a tuning network coupled to the loop antenna. The tuning network is disposed to provide simultaneous tuning at a plurality of interrogation frequencies. Further embodiments include a preamplifier circuit coupled to the loop antenna. The preamplifier circuit is disposed to receive the pick-up signal on an input node and provide a high impedance load to the loop antenna for a first of the plurality of interrogation frequencies to reduce the secondary radiation from the loop antenna to below a predetermined value at the said first interrogation frequency.

6 Claims, 6 Drawing Sheets

U.S. PATENT DOCUMENTS

| | | | |
|---|---|---|---|
| 4,730,161 A | 3/1988 | Cox et al. | |
| 4,742,304 A * | 5/1988 | Schnall et al. | 324/318 |
| 4,785,247 A | 11/1988 | Meador et al. | |
| 4,810,970 A | 3/1989 | Warren et al. | |
| 4,899,112 A | 2/1990 | Clark et al. | |
| 4,949,045 A | 8/1990 | Clark et al. | |
| 4,968,940 A | 11/1990 | Clark et al. | |
| 5,001,675 A | 3/1991 | Woodward | |
| 5,081,419 A | 1/1992 | Meador et al. | |
| 5,157,605 A * | 10/1992 | Chandler et al. | 702/7 |
| 5,233,522 A | 8/1993 | Sinclair | |
| 5,278,507 A | 1/1994 | Bartel et al. | |
| 5,296,866 A | 3/1994 | Sutton | |
| 5,389,881 A | 2/1995 | Bittar et al. | |
| 5,402,068 A | 3/1995 | Meador et al. | |
| 5,442,294 A | 8/1995 | Rorden | |
| 5,469,062 A | 11/1995 | Meyer, Jr. | |
| 5,491,488 A | 2/1996 | Wu | |
| 5,574,374 A | 11/1996 | Thompson et al. | |
| 5,672,971 A | 9/1997 | Meador et al. | |
| 5,682,099 A | 10/1997 | Thompson et al. | |
| 5,770,945 A * | 6/1998 | Constable | 324/350 |
| 5,811,972 A | 9/1998 | Thompson | |
| 5,869,968 A | 2/1999 | Brooks et al. | |
| 5,907,242 A * | 5/1999 | Gard | 324/326 |
| 6,211,678 B1 | 4/2001 | Hagiwara | |
| 6,216,090 B1 | 4/2001 | Hagiwara | |
| 6,218,842 B1 | 4/2001 | Bittar et al. | |
| 6,377,050 B1 | 4/2002 | Chemali et al. | |
| 6,400,148 B1 * | 6/2002 | Meyer et al. | 324/303 |
| 6,429,640 B1 | 8/2002 | Daughton et al. | |
| 6,459,265 B1 * | 10/2002 | Lou et al. | 324/322 |
| 6,603,312 B2 * | 8/2003 | Sinclair | 324/339 |
| 6,703,837 B1 | 3/2004 | Wisler et al. | |
| 6,777,940 B2 | 8/2004 | Macune | |
| 6,791,330 B2 | 9/2004 | McCormick | |

* cited by examiner

SERIES-RESONANT TUNING OF AN LWD RECEIVER

RELATED APPLICATIONS

This application is a division of U.S. patent application Ser. No. 10/427,899, filed May 1, 2003.

FIELD OF THE INVENTION

This invention relates to the field of well logging; in particular, it relates to electromagnetic wave propagation systems to measure an attribute which relates to at least one of the borehole and surrounding formation; and more particularly, it relates to antenna circuits that are deployable within a borehole to measure one or more attributes of an electromagnetic wave as it passes.

BACKGROUND OF THE INVENTION

In the practice of logging-while-drilling (LWD), measurement-while-drilling (MWD) and wireline logging, it is well known that by studying the propagation characteristics of an electromagnetic wave, useful clues regarding the characteristics of the earth formations can be derived. To probe sections of the earth surrounding the borehole, a pair of transmitters can be positioned within a well borehole to radiate an electromagnetic field at a particular interrogation frequency. This electromagnetic wave is influenced by the electromagnetic energy shed back from the formation. A pair of spaced differential loop antenna receivers is conventionally positioned within the borehole to measure, for example, the attenuation and/or phase shift of the electromagnetic wave as it passes between each receiver loop antenna. Various methods for analyzing the measurements to derive estimates of certain characteristics of the earth formations surrounding the well borehole are well known.

It is of increasing importance in oil and gas exploration to obtain accurate and reliable measurements of an electromagnetic wave investigating a formation. However, the accuracy of the information derived from the measurements can be degraded by the effects of magnetic field mutual cross-coupling between receiving loop antennae. Receiver cross-coupling typically results from significant circulating alternating current that is induced in a receiver loop antenna in response to an electromagnetic wave. This alternating current tends to produce a secondary electromagnetic field that can have a corrupting influence on the primary electromagnetic wave generated by a transmitter. The secondary electromagnetic field will affect the measurements obtained by any other receiving loop antenna in close proximity to the first receiver, producing an error component due to the cross-coupling. The receiving antenna closest to an active transmitter tends to receive a stronger signal and produce greater circulating currents than subsequently spaced receiving antennae. Accordingly, the magnitude of the undesirable secondary electromagnetic field radiated by an antenna tends to be greater from the receiving antenna that is closer to an active transmitter, and the magnitude of the error component due to cross-coupling tends to be higher in the next subsequently spaced receiving antenna.

Considerable effort has been expended by the industry to compensate measurements for the cross-coupling error. For example, one known method includes a calibration procedure where, under laboratory conditions, the cross-coupling error for each frequency of interest is measured and stored. Thereafter, each subsequently measured value is adjusted accordingly. Such methods tend to be cumbersome, may introduce new sources of error and may create maintenance restrictions. For example, extra components may be needed on the receiver circuits to simulate the cross-coupling effect in the lab. Parameters such as the distance between receivers, which will vary with temperature, are critical to the accuracy of the estimate of the cross-coupling error. In addition, the calibration may be invalidated by the replacement, in a receiver antenna system, of a failed component that influences the cross-coupling.

Eliminating the source of the cross-coupling error in downhole tools has proven to be problematic in the industry. For example, methods commonly employed to counter the excessive signal loss resulting from a lengthy coaxial cable, typically having a characteristic impedance less than 100 ohms, involve matching the receiver loop antenna impedance to the impedance of its load. However, the matching of receiver loop antenna impedance to that of its load typically results in significant circulating currents being induced in receiver loop that create receiver cross-coupling. Other methods employed by prior art systems include spacing receiver antennae as far apart as possible to reduce the effects of cross-coupling, such as locating each of a pair of receiver antennae on opposing sides of a pair of transmitters.

A strong pick up signal is an important consideration in obtaining accurate measurements. Prior art downhole tools that match the receiver antenna impedance to a load comprising a lengthy coaxial cable tend to employ single turn antennae, even though a multiple turn loop antenna typically provides the advantages of a strong pickup as compared to having a single turn antenna. A multiple turn loop antenna, in the range of 6 to 12 inches diameter, commonly exhibits several hundred ohms of impedance at 2Mhz. Thus, prior art methods for matching the receiver antenna to the load impedance combined with the use of a step-up transformer, tend to limit a receiver loop antenna to no more than a single turn.

A further limitation of prior art receiver loop antenna systems is their inability to be simultaneously series tuned at multiple interrogation frequencies. It well known that it is advantageous to utilize multiple interrogation frequencies to probe earth formations with electromagnetic waves. Certain attributes of the earth formation are discoverable only when the interrogation frequency is of a specific range. Lower frequencies are able to investigate deeper regions of the earth for a given transmitter and receiver spacing. Also, lower frequencies often mitigate borehole effects. Higher frequencies yield higher phase shift and attenuation values for a given resistivity, which is advantageous for increased accuracy in highly resistive formations of commercial interest. In LWD and MWD systems where measurements are commonly obtained while the measuring tool is rotating and moving axially through the borehole, greater and more accurate information about the surrounding earth formation can be derived by obtaining simultaneous measurements of a plurality of interrogation frequencies.

There is therefore a need in the art for receiver systems, deployable within a borehole, that can utilize a loop antenna having multiple turns, as opposed to a single turn, to enable the antenna to pick-up a strong signal from which a more accurate measurement of particular attributes of an electromagnetic wave can be derived. Also, there is a need for a loop antenna that can be simultaneously series tuned at plurality of interrogation frequencies to enable it to simultaneously and accurately pick-up the plurality of interrogation frequency components from an electromagnetic wave. In addition, there is a need for a method for decreasing the design, manufacture, and maintenance cost of systems, that deploy a pair of loop antenna receivers downhole, while still diminishing the undesirable effects of mutual cross-coupling. Furthermore, there is an ever present need for downhole antenna systems that are stable over a wide range of temperatures, and that provide increasingly accurate and greater amounts of information about the earth formations surrounding a borehole.

SUMMARY OF THE INVENTION

In accordance with one aspect of the invention, a loop antenna circuit is provided for use in a borehole. The loop antenna circuit includes a loop antenna disposed to generate, in response to an electromagnetic wave, a pick-up signal on an output node thereof, the pick-up signal representative of, for each of a plurality of interrogation frequencies, relative magnitude and relative phase of the electromagnetic wave. The loop antenna circuit further includes a tuning network electrically connected to the loop antenna, the tuning network configured to tune the loop antenna such that a combined source impedance of the loop antenna and the tuning network varies with frequency, the combined source impedance having minima within a preselected band of frequencies about each of the interrogation frequencies.

In accordance with another aspect of the invention, a receiver is provided for a downhole tool. The receiver includes a loop antenna, a tuning network electrically connected in series with the loop antenna, and a preamplifier circuit having an input electrically connected in series with the loop antenna and the tuning network. The loop antenna is disposed to receive an electromagnetic wave in a borehole and includes at least a single turn of antenna wire deployed about a tool housing. The tuning network is configured such that a series impedance of the loop antenna and the tuning network is less than the impedance of the loop antenna in a preselected frequency band about at least one interrogation frequency. The preamplifier circuit has an input impedance selected such that a series impedance of the loop antenna, the tuning network, and the preamplifier circuit is sufficiently high to reduce secondary radiation from the loop antenna to below a predetermined value at the at least one interrogation frequency.

In accordance with still another aspect of this invention, a logging while drilling tool is provided for use in a subterranean borehole. The logging while drilling tool includes a housing adapted to be coupled to a drill string and deployed in a subterranean borehole. A transmitter is deployed on the housing, the transmitter disposed to transmit an electromagnetic wave into the borehole, the electromagnetic wave including a plurality of interrogation frequency components. First and second, longitudinally spaced loop antennas are disposed to receive the electromagnetic wave, each of the loop antennas having at least a single turn of antenna wire deployed about the tool body. The logging while drilling tool further includes a tuning network electrically connected in series to the first loop antenna. The tuning network is configured such that a series impedance of the loop antenna and the tuning network is less than the impedance of the loop antenna in a preselected frequency band about each of said plurality of interrogation frequencies.

It is therefore a technical advantage of the invention is to provide antenna receiver systems to measure the amplitude and phase of a plurality of interrogation frequencies included in an electromagnetic wave with improved accuracy as compared with prior art systems. Additionally, the present invention provides cost effective and space efficient loop antenna receivers that work reliably in the adverse conditions commonly found while drilling in a subterranean borehole.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
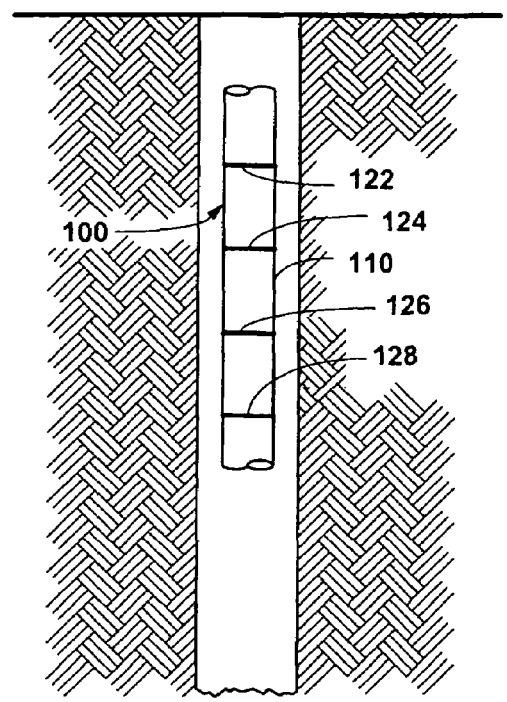
FIG. 1 depicts, in block diagram form, an exemplary measuring tool on which the present invention may be deployed.

FIG. 1 shows, in block diagram form, a portion of one exemplary embodiment of a measuring tool 100 on which the present invention may be deployed. Measuring tool 100 is deployable within a subterranean borehole to investigate the propagation characteristics of an electromagnetic wave passing through the surrounding earth formation. Measuring tool 100 may be advantageously employed to determine an attribute of either a section of the borehole or a section of the surrounding earth formation, such as, for example, its resistivity or its dielectric constant.

Measuring tool 100 comprises a logging collar 110, which, in FIG. 1 is illustrated as essentially an elongated steel shaft. Logging collar 110 is adapted to be positioned within a borehole 140. In one embodiment, logging collar 110 is adapted to be in the drill string close to the drill bit to provide measurement-while-drilling or logging-while-drilling. Measuring tool 100 is advantageously adapted to provide accurate measurements under a wide range of ambient temperatures and adverse conditions commonly found while drilling within a subterranean borehole.

In a first exemplary embodiment, logging collar 110 includes two transmitters TX1 122, TX2 128 and a pair of differential receiver antennae RX1 124 and RX2 126. TX1 122, TX2 128, RX1 124 and RX2 126 each comprise a coil that is wound with one or more turns on an insulating surface within in a recess circumferential to logging collar 110. In one suitable embodiment TX1 122 and TX2 128 are spaced about 4 to 8 ft apart, axially on logging collar 110. TX1 122 and TX2 128 are individually controllable to selectively radiate an electromagnetic wave comprising a plurality of predetermined interrogation frequency components. In the exemplary embodiment, two interrogation frequencies 500 Khz and 2 Mhz are employed. In another exemplary embodiment, a third interrogation frequency of 1 Mhz is also employed. In the exemplary embodiment, RX1 124 and RX2 126 are spaced about 10 inches apart axially on logging collar 110 and centered between TX1 122 and TX2 128. Receiver antenna RX1 124 and RX2 126 are each adapted to detect bands of frequencies centered on each of the plurality of interrogation frequencies. A pick-up signal is generated by each receiver antenna RX1 124 and RX2 126 representing the phase shift and/or attenuation of the interrogation frequency components as the electromagnetic wave passes between the differential pair of receiver loop antennae RX1 124 and RX2 126.

One skilled in the art will recognize that the embodiments of the present invention are not limited to logging-while-drilling or measurement-while-drilling applications, and may be extended to other types of applications, such as, for example, wire line systems. Embodiments will further be appreciated to be adaptable for a wide range of logging collar geometries and axial spacing for receivers and transmitters, as well as a wide range of interrogation frequencies. In addition, embodiments of the present invention may include tools having a single transmitter.

Figure 2A:
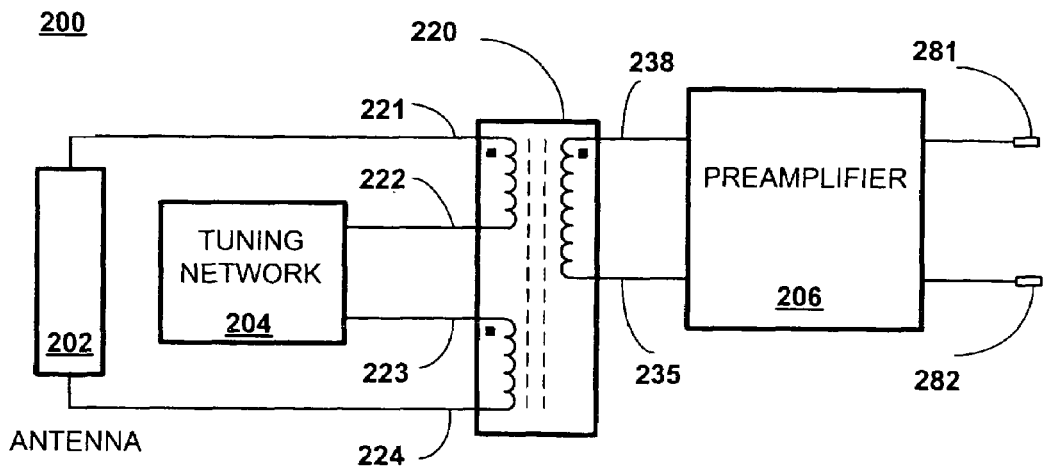
FIG. 2A is a schematic block diagram of an exemplary embodiment of the present invention.

FIG. 2A depicts a schematic block diagram of an exemplary embodiment of an antenna receiver system 200, which is suitable for the measuring tool 100 of FIG. 1 having receiver antennae RX1 124 and RX2 126. Antenna receiver circuit 200 includes antenna 202, which, in the exemplary embodiment, is a loop antenna corresponding to either of RX1 124 or RX2 126, having about a 6 inch diameter, 6 turns, and an inductance of approximately 18 μh. Antenna 202 is coupled in series with the primary winding of a step-up transformer 220 and tuning network 204, so as to generate a pick-up signal across the secondary winding of transformer 220 (in the form of a voltage differential across nodes 235 and 238) in response to an electromagnetic wave passing antenna 202. The secondary winding of transformer 220 is coupled to a preamplifier circuit 206 that generates an amplified version of the pick-up signal on output nodes 281 and 282. In an exemplary embodiment, output nodes 281 and 282 couple through a 4 to 6 foot coaxial cable (having a characteristic impedance of 50 to 100 ohms) to an external amplifier circuit, which is not shown. A microprocessor-based data acquisition system (not shown) samples the preamplifier output signal to determine the relative amplitude and relative phase of the electromagnetic wave at each of the plurality of interrogation frequencies.

Still referring to FIG. 2A, step-up transformer 220 serves to amplify the signal received from antenna 202 on the primary winding to provide a pick-up signal on the secondary winding. Conductors 221 and 224 each couple to an opposite end of the primary winding of step-up transformer 220. Conductor 221 couples to a first end of antenna 202 and conductor 221 couples to the other end of antenna 202. The primary winding of transformer 220 is split at nodes 222 and 223 to define a first portion and a second portion of the primary winding. Tuning network 204 couples to nodes 222 and 223 to be in series with antenna 202 and the primary winding of step-up transformer 220. In an exemplary embodiment, step-up transformer 220 is of common bobbin construction and is comprised of a standard core from TDK™ part number PC44ER11/5-Z; each of the two primary winding comprises of 5 turns of #32 wire and the secondary winding comprises 32 turns of #34 wire. One skilled in art will recognize that although it is advantageous to split the primary side of the transformer into a first and second portion to balance the effects of stray capacitance and inductance inherent in the components and conductors, other suitable embodiments are available, such as a transformer that is not split, or that has a center tap on the primary winding.

Tuning network 204 cooperates with antenna 202 to achieve "simultaneous tuning" at a plurality of interrogation frequencies. "Simultaneous tuning" results in a pick-up signal that is strong for the bands approximately centered at each of the plurality of interrogation frequencies and attenuated for the other frequencies (i.e. out-of-band frequencies).

The exemplary embodiment of antenna receiver circuit 200 is advantageously configured with antenna 202 and tuning network 204 coupled in series to achieve "simultaneous series tuning" at a plurality of interrogation frequencies. This is implemented by providing for the impedance of the antenna 202 and tuning network 204 combination to be negligible (advantageously close to zero) for a narrow band around each of the interrogation frequencies and, at the same time, for the impedance to rise for out-of-band frequencies so that reception by the antenna 202 effectively excludes (or substantially attenuates) out-of-band frequencies. The exemplary embodiment of antenna receiver circuit 200 provides for negligible impedance of about 10 ohms, which is sufficiently low for most applications, although the invention is not limited in this regard. One skilled in the art will understand that the bands are substantially centered on each of the interrogation frequencies and are preferably as narrow as possible to advantageously provide a high signal-to-noise ratio when in-band. However, the invention is not limited to any particular in-band bandwidth, and the width of the narrow bands may be selected to specifically attenuate particular frequencies anticipated in particular embodiments to cause interference with the electromagnetic wave measurements at the interrogation frequencies.

Figure 2B:
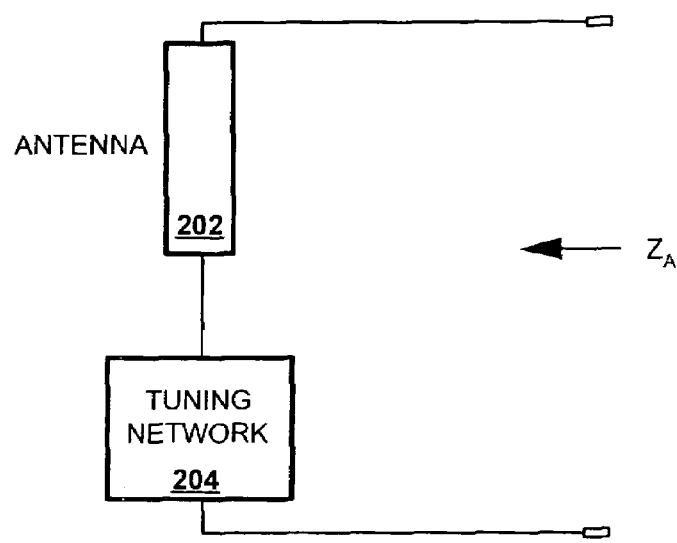
FIG. 2B is a schematic block diagram of an exemplary embodiment of the present invention.
Figure 2C:
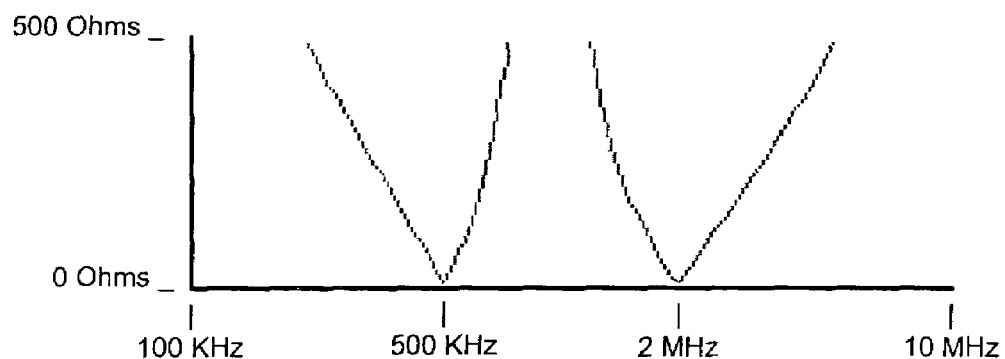
FIGS. 2C and 2D are plots of impedance versus frequency responses for alternative embodiments of the present invention.
Figure 2D:
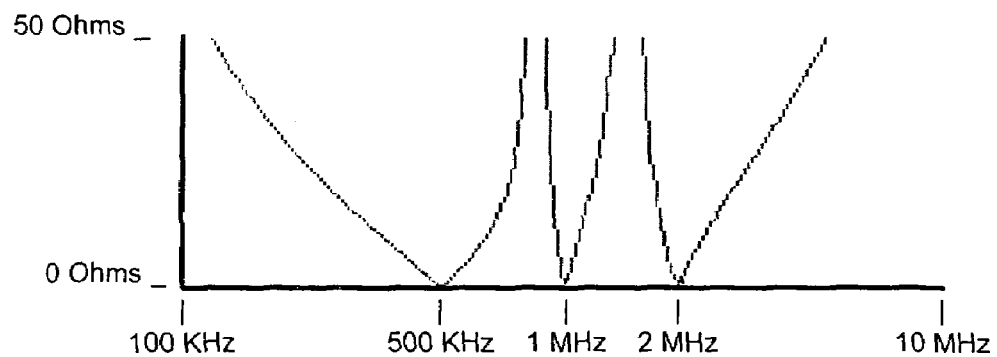

FIGS. 2B, B2, 2C and 2D illustrate simultaneous series tuning for two exemplary embodiments. FIG. 2B shows $Z_A$ selected to represent the impedance of the antenna 202 and tuning network 204 combination shown on FIG. 2A. FIG. 2C and 2D are plots of impedance $Z_A$ versus interrogation frequency approximated by an analog circuit simulator. The vertical scale represents impedance linearly. The horizontal scale is logarithmic and represents the frequency range of 100 Khz through 10 Mhz. FIG. 2C shows the impedance $Z_A$ versus frequency response for an exemplary embodiment of tuning network 204 that provides simultaneous series tuning at the two interrogation frequencies of 500 KHz and 2Mhz. FIG. 2D depicts the impedance $Z_A$ versus frequency response for an alternate embodiment of a tuning network 204 that provides simultaneous series tuning at the three interrogation frequencies of 500 KHz, 1 Mhz and 2 Mhz. As shown in FIGS. 2C and 2D, the impedance $Z_A$ is negligible for a narrow band centered on each of the interrogation frequency and rises for the out-of-band frequencies.

It will be understood that the level of source impedance of the antenna 202 and tuning network 204 combination is of interest. Consistent with the invention, a source impedance that will provide sufficient attenuation so as to effectively exclude out-of-band frequencies is dependent on the load impedance. For example, with further reference to FIG. 2A, if a preamplifier 206 exhibits an input impedance of 3600 ohms at a particular out-of-band frequency, then a step-up transformer 220 with a turns ratio of 5:5:32 (i.e. 1 to 3.2), will present a load impedance of about 350 ohms to the antenna 202 and tuning network 204 combination. Thus, when the combination of antenna 202 and tuning network 204 has a source impedance of 350 ohms, the pick-up signal across the secondary windings of transformer 202 is attenuated by 6 db (i.e. signal is reduced by a factor of 2). Attenuation for out-of-band frequencies can be designed to be much higher, as illustrated by another exemplary embodiment shown on FIG. 2I.

In accordance with another aspect of the invention, the impedance of the load presented to the combination of antenna 202 and tuning network 204 may be tailored to reduce the secondary electromagnetic radiation from antenna 202 to below a predetermined value. Generally speaking, it is understood that the magnitude of a secondary magnetic field radiated by an antenna (such as antenna 202 on FIGS. 2A, 2B and 2G) is proportional to the frequency for a given circulating current. For this reason, the load impedance may be tailored to be higher for the higher interrogation frequencies, as compared to the lower interrogation frequencies in order to reduce measurement error components due to antenna differential pair magnetic cross-coupling. The particular interrogation frequencies may be selected for each application based on the attributes of a formation being investigated. The impedance characteristics of the load presented to antenna 202 and tuning network 204 may be tailored specifically for each application based, for example, on the selected interrogation frequencies, the source impedance characteristics, and desired gain of the received pick-up signal. The invention is not limited in regard to selection of load impedance. For out-of-band frequencies, preamplifier circuit 206 may present a low impedance load to the antenna 202 and tuning network 204 without affecting the measurements.

Figure 2E:
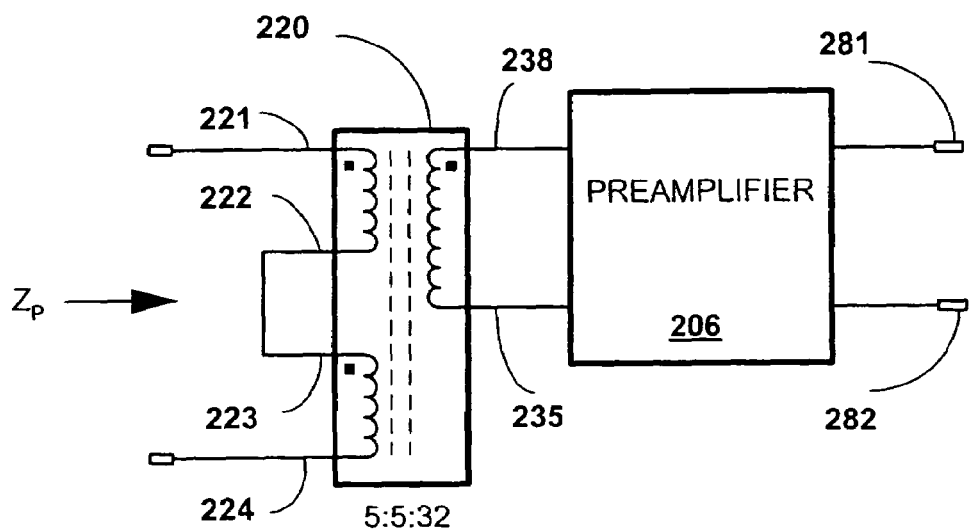
FIG. 2E is a schematic block diagram of an exemplary embodiment of the present invention.
Figure 2F:
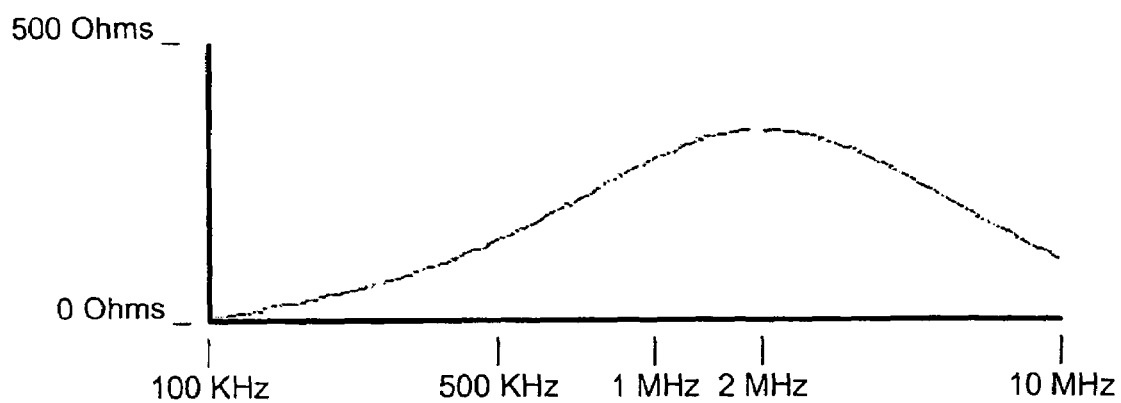
FIG. 2F is a plot of impedance versus frequency responses for an exemplary embodiment of the present invention.

FIG. 2E shows a block diagram of an embodiment of a preamplifier 206 that has an input impedance that presents a load impedance to tuning network 204 and antenna 202. In FIG. 2E, the load impedance is tailored to reduce the secondary electromagnetic radiation from antenna 202 to be below a predetermined level. Zp is selected to illustrate the input impedance characteristics of preamplifier 206. FIG. 2F is a plot of Zp derived by shorting the signal across nodes 222 and 223 and simulating the impedance observed across nodes 221 and 224. FIG. 2F shows that in a particular embodiment, at 2 Mhz the impedance Zp is about 350 ohms.

Figure 2G:
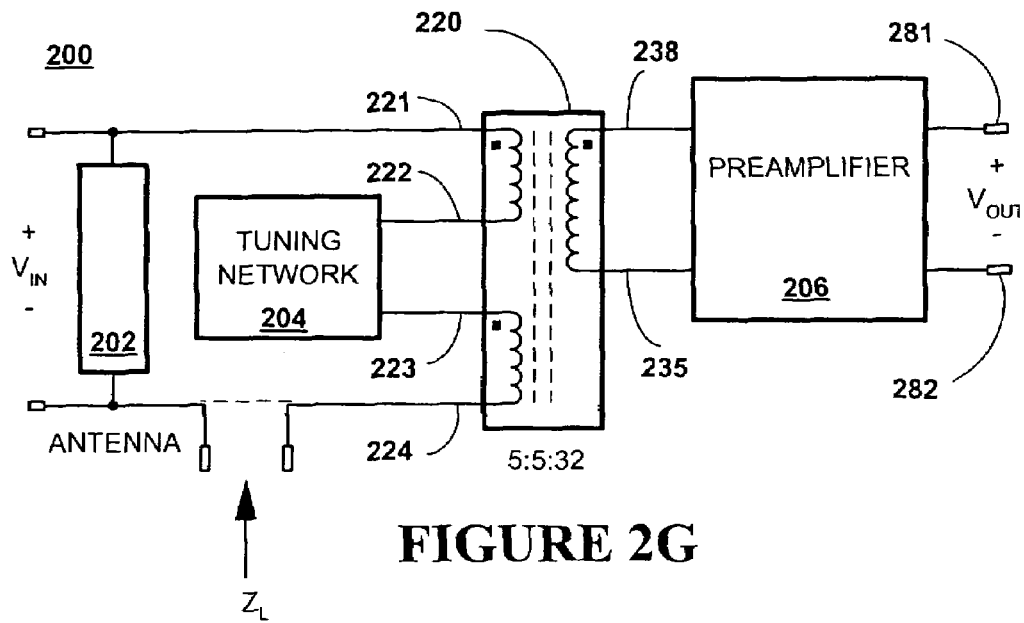
FIG. 2G is a schematic block diagram of an exemplary embodiment of the present invention.
Figure 2H:
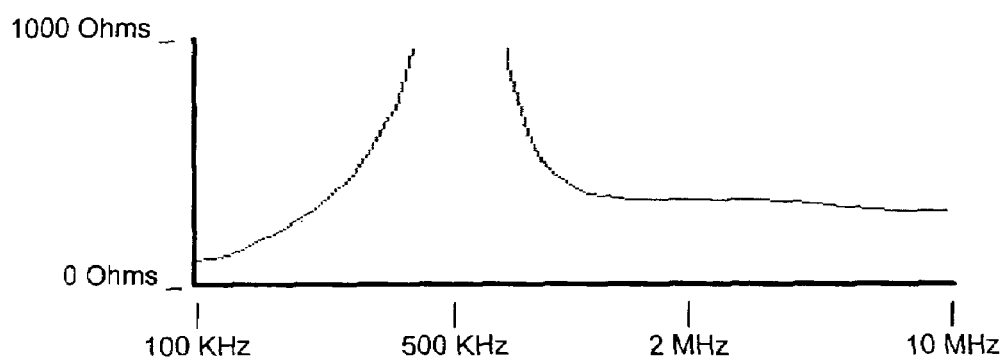
FIG. 2H and 2I are plots of impedance and gain responses, respectively, of an exemplary embodiment of the present invention.
Figure 2I:
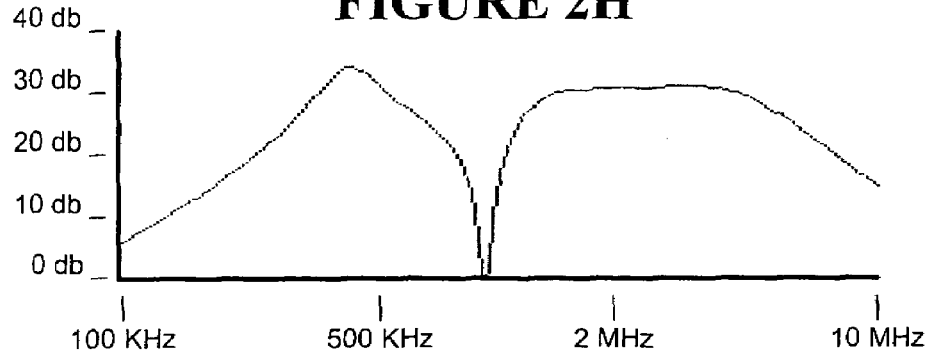

FIGS. 2G through 2I are illustrative of the low level of circulating currents in antenna 202 achieved, in the exemplary embodiments, while maintaining serviceable gain at each of the plurality of interrogation frequencies. FIG. 2G shows antenna receiver system 200 with the embodiment of tuning network 204 that has the characteristics shown in FIG. 2C, and the preamplifier that has the characteristics shown in FIG. 2F. FIG. 2H is a plot of impedance $Z_4$ versus frequency response for the antenna receiver system 200 shown in FIG. 2G. $Z_4$ is selected, for illustration purposes, by breaking the circuit at node 224 and simulating the impedance $Z_4$ versus frequency response to indicate the level of circulating currents in antenna 202. FIG. 2I is a simulated plot approximating the gain Vout/Vin, as shown in FIG. 2G with node 224 coupled to antenna 202 (as shown by the dotted line). The gain achieved for each of the two interrogation frequencies of 500 Mhz and 2 Mhz is shown, as well as the relative attenuation of the other frequencies.

Additional considerations may be required in the tailoring of the antenna source/load impedance. The antenna load impedance primarily comprises of the "magnetizing" impedance of transformer 220 and the impedance presented by preamplifier circuit 206. These two impedances are in parallel. Step-up transformer 200 may have a magnetizing impedance that varies with frequency as well as temperature. In order to maintain thermal stability of the combined impedance within the wide range of extreme temperature conditions that may be encountered within a borehole, the impedance of the preamplifier may advantageously be selected to be lower than that of the transformer at the integration frequencies.

The conductors coupling antenna 202 to preamplifier circuit 206 are preferably implemented to be short, in order to minimize the load on antenna 202. In actual application, however, the tuning network 204 and preamplifier circuit 206 may effectively negate this minimized loading, as the preamplifier, in the exemplary embodiments, may need to be located within a few inches of the receiver antenna.

In accordance with another aspect of the present invention, exemplary embodiments may employ a substantial mismatch in the impedance of antenna 202 and its load to allow embodiments of antenna 202 to comprise of more than one turn. For example, a six turn antenna of about a 6 inch diameter has a characteristic inductance of about 18 µH. It is generally understood that multiple turn antenna generally provide a stronger pick-up signal than can be achieved with a single turn antenna of similar geometries. The invention is nonetheless not limited in this regard, and other embodiments may advantageously provide receiver circuits having an antenna with a single turn, two or more turns, or a different geometry.

Figure 3:
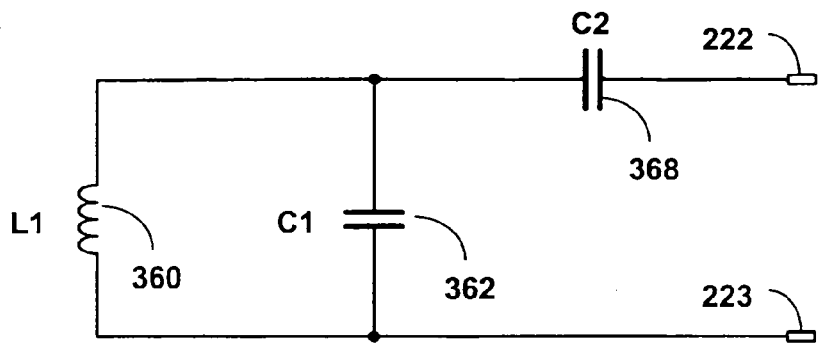
FIG. 3 is a schematic of an embodiment of a tuning network in accordance with the present invention.

FIG. 3 is a detailed schematic of an exemplary embodiment of a tuning network 300 that is suitable for the tuning network 204 shown in FIG. 2. Tuning network 300 is configured, in the illustrated embodiment, to provide simultaneous series tuning at the two predetermined interrogation frequencies of 500Khz and 2Mhz, although it will be understood that the invention is not limited in this regard. Tuning network 300 on FIG. 3 for loop antenna 202 on FIG. 2A is coupled in series to the primary winding of step-up transformer 220 and antenna 202. One end of tuning network 300 couples to node 222 and on the other end to node 223, as shown on both FIGS. 2A and 3. Tuning network 300 is comprised of inductor L1 360 and capacitor C1 362, which are coupled together in parallel. The parallel combination is coupled in series with capacitor C2 368.

As noted earlier in the discussion of FIG. 2A, antenna 202 and tuning network 204 cooperate to achieve simultaneous series tuning by providing for a combined impedance that effectively excludes (or substantially attenuates) reception at frequencies outside each of the narrow bands of frequencies around the plurality of interrogation frequencies. For a given antenna inductance $L_{Ant}$, the following simultaneous equations are satisfied for two operating frequencies (it is assumed that the real part of the various impedances are negligible):

$$Z_{Ant1}+Z_{C2}+Z_{C1L1}=0 \text{ at Frequency } F1 \quad (1)$$

$$Z_{Ant2}+Z_{C2}+Z_{C1L1}=0 \text{ at Frequency } F2 \quad (2)$$

where $Z_{Ant}>0$, $Z_{c2}<0$ and represents the reactance of antenna 202 and the reactance of tuning capacitor C2 368; and $Z_{C1L1}=$ $(Z_{C1}*Z_{L1})/(Z_{C1}+Z_{L1})$ and represents the net reactance of the parallel combination of L1 360 and C1 362.

In an exemplary embodiment, the interrogation frequencies are selected to be about 500 Khz and 2 Mhz and antenna 202 has a characteristic inductance $L_{Ant}$ of 18 µH; C1 362 is selected to be 620 pfd; C2 368 is selected to be 1250 pfd; and inductance of L1 360 is selected to be 47 µH. In addition, the effective inductance variation of antenna 202 at the different operating frequencies preferably is taken into account. Inductance variation with frequency may occur if the self-resonant frequency of the loop antenna 202 is not significantly higher than the highest desired operating frequency.

Figure 4:
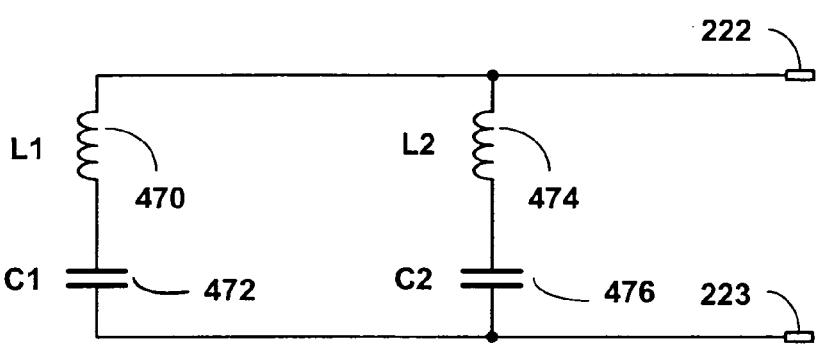
FIG. 4 is a schematic of an alternative embodiment of a tuning network in accordance with the present invention.

Typically there is also a point of maximum impedance between the two minima. Selection of inductor L1 360 has some influence on the frequency point of maximum impedance located between the two minima, and also on the impedances of the out-of-band frequencies; however, the values of C1 362 and C2 368 are unique for a given value of L1 360 and the value of $L_{Ant}$ FIG. 4 shows a detailed schematic of an alternative embodiment of a tuning network 400 that is suitable for a tuning network 204 shown in FIG. 2. Tuning network 400, in an exemplary embodiment, is configured to provide simultaneous series tuning at the two selected interrogation frequencies of 500 Khz and 2 Mhz. Tuning network 400 for loop antenna 202 is coupled in series to the primary winding of step-up transformer 220 and antenna 202. One end of tuning network 400 couples to node 222 and on the other end to node 223. Tuning network 400 comprises of the parallel configuration of two circuits: the first circuit comprises an inductor L1 470 and a capacitor C1 472 that are coupled together in series and the second circuit comprises an inductor L2 474 and a capacitor C2 476 that are coupled together in series. The inductance of the antenna 202 and tuning network 204 is preferably negligible (advantageously as close to zero) at each interrogation frequency to achieve simultaneous series tuning. Accordingly, the following two equations are solved for each of the two interrogation frequencies F1 and F2 to determine the particular values of inductance for L1 470 and L2 474 and particular values of capacitance for C1 472 and C2 476:

$$Z_{Ant} + \frac{(Z_{L1}+Z_{C1})(Z_{L2}+Z_{C2})}{Z_{L1}+Z_{C1}+Z_{L2}+Z_{C2}} = 0 \text{ at frequency } F1 \quad (3)$$

$$Z_{Ant} + \frac{(Z_{L1}+Z_{C1})(Z_{L2}+Z_{C2})}{Z_{L1}+Z_{C1}+Z_{L2}+Z_{C2}} = 0 \text{ at frequency } F2 \quad (4)$$

Figure 5:
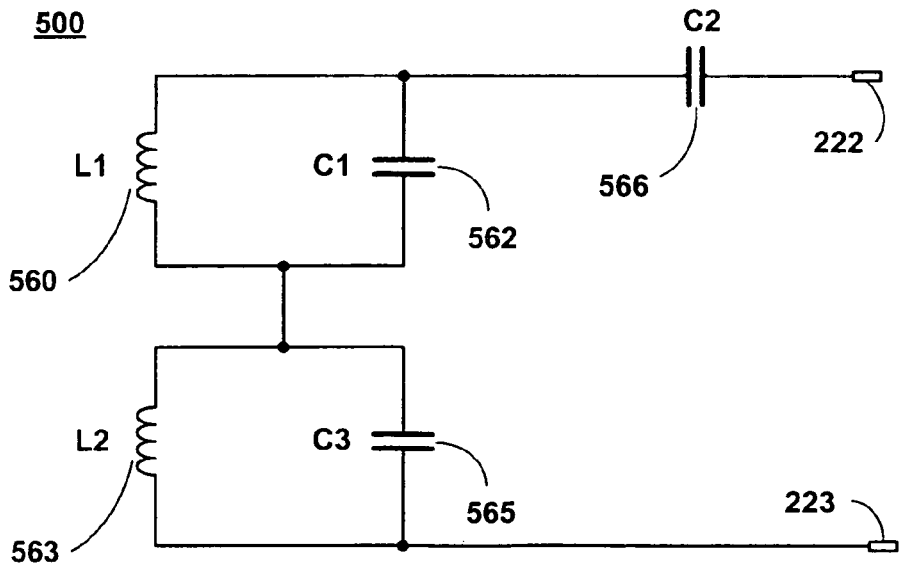
FIG. 5 is a schematic of a further alternative embodiment of a tuning network in accordance with the present invention.

With reference to FIG. 5, one skilled in the art will recognize that the present invention is not limited in its series tuning aspect to any particular number of interrogation frequencies. For example, FIG. 5 shows a tuning network 500 which provides simultaneous series tuning at three interrogation frequencies of 500 Khz, 2 Mhz and 1 Mhz. One end of tuning network 500 couples to node 222 and on the other end to node 223. Tuning network 500 comprises a parallel combination including inductor L1 560 and capacitor C1 562, and a parallel combination including L2 563 and C3 565. The two parallel combinations are coupled in series together and with capacitor C2 566. Simultaneous series tuning is achieved by providing an equation representing the combined impedances of the tuning network 500 and antenna 202 and solving the equation to where the combined impedance is zero at each of the three interrogation frequencies.

Antenna 202 and tuning network 204 cooperate to achieve simultaneous series tuning by providing for a combined impedance that sufficiently attenuates reception by antenna 200 to effectively exclude reception at frequencies outside each of the predetermined narrow bands of frequencies around the interrogation frequencies. This approach leads to three equations that are solved for a 18 µH antenna 202 at the three interrogation frequencies of 500 Khz, 1 Mhz, and 2 Mhz. L1 and L2 are each selected to be 10 µH, C2 is selected to equal 2400 pfd, C3 is selected to equal 1100 pfd and C1 is selected to equal 3300 pfd.

Figure 6A:
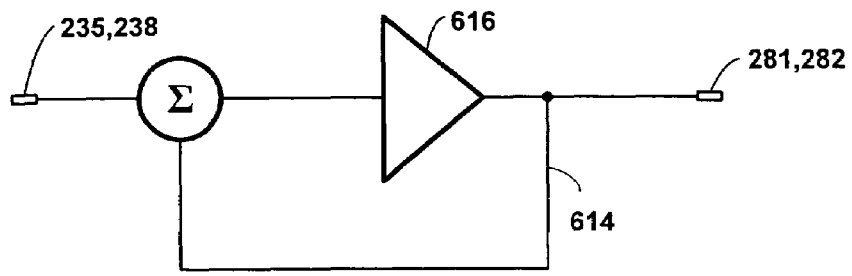
FIG. 6A and 6B are schematics of an embodiment of a preamplifier circuit in accordance with the present invention.

FIG. 6A depicts a high-level block diagram of a circuit suitable for the preamplifier circuit 206 depicted in the schematic of FIG. 2. In FIG. 6A, the impedance of the load to antenna 202 and tuning network 204 is advantageously tailored specifically for a particular application based on the selected plurality of interrogation frequencies. This objective is to reduce the effect of the secondary electromagnetic field to below a predetermined acceptable level. A pick-up signal from the secondary winding of step-up transformer 220 is received on input nodes 235 and 238. An amplified version of the pick-up signal is generated on output nodes 281 and 282. Preamplifier circuit 206, in this exemplary circuit, is comprised of an amplifier circuit 616, with a positive gain, and a positive-feedback path 614 for providing feedback that is a function of frequency to tailor the input impedance of the preamplifier circuit 206.

It will be appreciated that the present invention is also able to reduce the disadvantageous effectives of cross-coupling. A beneficial result of maximizing the load impedance presented to the receiver loop antenna 202 is that the secondary electromagnetic field radiated by receiver loop antenna 202 is minimized for the interrogation frequencies, thereby diminishing the cross-coupling error in any other receiver antenna that is sufficiently close to be measurably affected by cross-coupling. In addition, the feedback mechanism may be selected specifically to maintain thermal stability of the combined load impedance of the step-up transformer 202 and the preamplifier circuit 206.

Figure 6B:
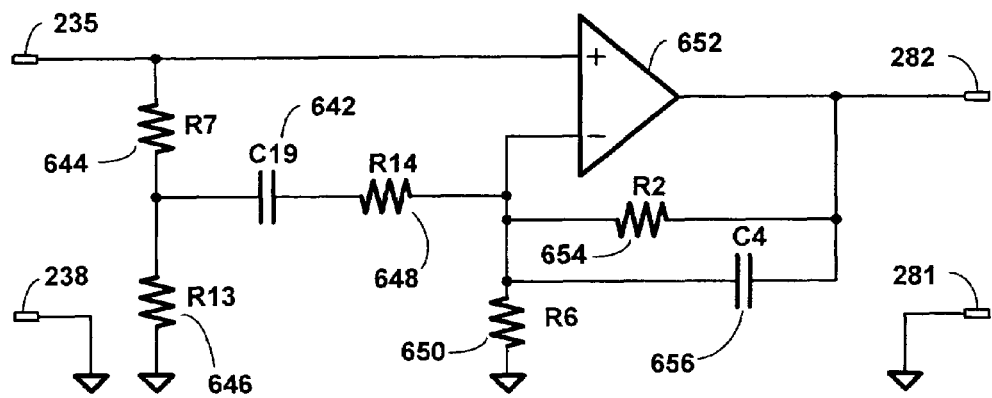

FIG. 6B shows a detailed schematic of an exemplary embodiment that is suitable for a preamplifier circuit 206. Node 238 and node 281 are coupled to a common ground. A pick-up signal from the secondary winding of step-up transformer 220 is received on node 235 and an amplified version of the pick-up signal is generated on amplifier output node 282. Amplifier circuit 616 is implemented with operational amplifier 652 in conjunction with resistors R7 644, R13 646, R2 654 and C4 656 to receive the pick-up signal on node 235 and to generate an amplified version of the pick-up signal on output node 282. A positive-feedback path 614 is provided by the series network, linking the output node 282 to the positive input of operational amplifier 652. Positive feedback path 614 comprises resistor R7 644, capacitor C1 9642, resistor R14 648, and the parallel combination of R2 654 and C4 656.

In one embodiment of the circuit of FIG. 6B, operational amplifier 652 may be deployed in the form of an integrated circuit available from Elantec, part no. EL2125. Resistor R2 654 and capacitor C4 656 are coupled together in parallel and each couple on one end to output node 282 and on the other end to the negative input to operational amplifier 652. In this exemplary embodiment, resistor 654 is 100 ohms and capacitor 656 is 47 pf. The negative input of operational amplifier 652 is coupled to ground through resistor R6 650, which is 10 ohms. Resistors R7 644 and R13 646 are each 750 ohms and are each coupled on one end in series to each other. One end of the resistor pair R7 644 and R13 646 is coupled to the positive input of operational amplifier 652 and the other end of resistor pair R7 644 and R13 646 is coupled to ground. Capacitor C19 642, selected to be 1000 pf, is coupled in series to resistor R14 648, selected to be 249 ohms. The series combination of capacitor C 19 642 and resistor R14 648 are coupled on one end to the negative input of operational amplifier 652 and on the other end to the node that couples to both of the resistors R7 644 and R13 646.

In the exemplary embodiment depicted in FIG. 6B, preamplifier circuit 206 is specifically tailored for interrogation frequencies 500 Khz and 2 Mhz. The addition of capacitor C19 642 and resistor R14 648 provide the positive-feedback path 614 shown in FIG. 6A, which increases the input impedance of the preamplifier circuit 206 at 2 Mhz and to a lesser degree at 500 Khz. This particular configuration of a positive-feedback path, also known as "boot-strapping," results in the effective load impedance of the pre-amplifier 206 being increased by more than a factor of two at 2 MHz. In addition, the impedance at the lower operating frequency has also been increased significantly. The capacitance value of C19 642 and resistance value of R14 648 are selected to increase or decrease the amount of positive feedback at the plurality of interrogation frequencies to reduce the magnitude of the secondary electromagnetic field to below a predetermined acceptable level. Note however that, in some applications, the shunt admittance of the transformer, if dominant, may tend to create thermal instability of the input impedance presented by the step-up transformer 220 and preamplifier circuit 206. In such situations, thermal instability considerations may set an upper boundary for efforts to increase the input impedance of the preamplifier circuit 206.

With further reference to the exemplary embodiment depicted in FIG. 6B, the impedance of the preamplifier circuit 206 without the presence of capacitor C19 642 and resistor 648 R14 would be approximately 1500 ohms, which is the sum of the two 750 ohm resistors. The addition of capacitor C19 642 and resistor R14 648 raises the input impedance of the preamplifier circuit from 1500 ohms to approximately 3500 ohms at the 2 MHz interrogation frequency. At interrogation frequency 500 Khz, the impedance of the preamplifier circuit is about 2600 ohms and the load impedance presented to the antenna is about 146 ohms due to the step-up transformer. Accordingly, the secondary electromagnetic field and error due to cross-coupling are kept below a predetermined value for each of the interrogation frequencies.

It will be appreciated that a higher value of impedance for the preamplifier circuit 206 could be achieved by reducing the turns ratio of the step-up transformer. However, such a reduction in the turns ratio would require additional amplification by pre-amplifier 206, thereby potentially causing a decrease in the signal to noise ratio of the antenna receiver 200.

Figure 7:
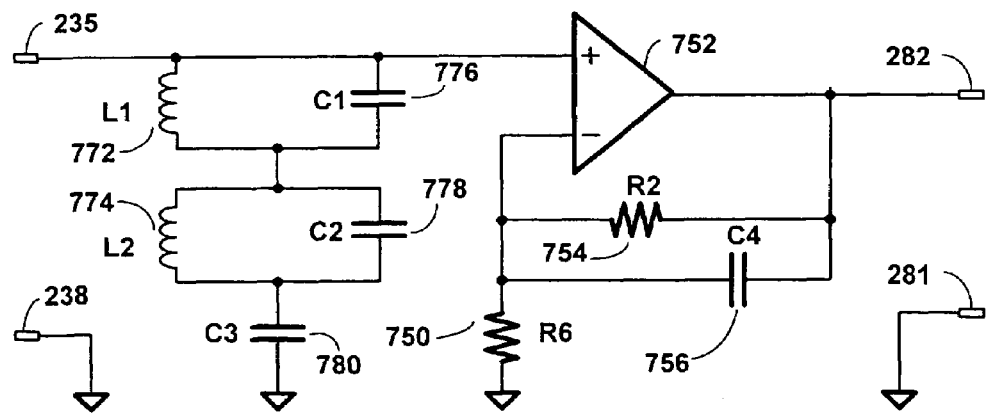
FIG. 7 is a schematic of an alternative embodiment of a preamplifier circuit in accordance with the present invention.

FIG. 7 depicts a detailed schematic diagram of an alternative exemplary circuit that would be suitable for the preamplifier 206 shown in FIG. 2. A series of LC circuits are provided to tailor the input impedance for a selected plurality of interrogation frequencies so as to minimize cross-coupling between receiver antennae. The positive input to operational amplifier 752 is coupled to the secondary winding of step-up transformer 220 through node 235 to receive the pick-up signal from antenna 202. The output of the operational amplifier connects to output node 282. Resistor R2 754 and capacitor C4 756 are coupled together in parallel and each couple on one end to output node 282 and on the other end to the negative input to operational amplifier 752. In this exemplary embodiment, resistor R2 754 is 100 ohms and capacitor C4 756 is 47 pf. The negative input of operational amplifier 752 is coupled to ground through 10 ohm resistor R6 750. The positive input to the operational amplifier 752 connects to ground through a DC blocking capacitor C3 780 and a circuit comprising two LC circuits coupled in series. The first LC circuit comprises inductor L1 772 coupled in parallel to capacitor C1 776. The second LC circuit comprises inductor L2 774 coupled in parallel to capacitor C2 778. The values of L1 772 and C1 776 are advantageously selected according to the following equation for the first interrogation frequency F1:

$$F1 = \frac{1}{2\pi\sqrt{L1C1}} \tag{5}$$

The values of L2 and C2 are advantageously selected according to the following equation for the second interrogation frequency F2:

$$F2 = \frac{1}{2\pi\sqrt{L2C2}} \tag{6}$$

Although the present invention and its advantages have been described in detail, it should be understood that various changes, substitutions and alternations can be made herein without departing from the spirit and scope of the invention as defined by the appended claims.

I claim:

1. A receiver for a downhole tool, the receiver comprising:
   a loop antenna including at least a single turn of antenna wire deployed about a tool housing, the loop antenna disposed to receive an electromagnetic wave in a borehole;
   a tuning network electrically connected in series with the loop antenna such that the loop antenna and the tuning network in combination form a series-resonant circuit that series resonates at a plurality of preselected interrogation frequencies;
   a transformer having primary and secondary windings, the primary winding electrically connected in series with the loop antenna and the tuning network; and
   a preamplifier circuit electrically connected to the secondary winding of the transformer, the preamplifier circuit and the transformer disposed to present a load impedance to the tuning network and the loop antenna, the load impedance selected to be sufficiently high to reduce secondary radiation from the loop antenna to below a predetermined value at at least one of the interrogation frequencies.

2. The receiver of claim 1, wherein the loop antenna comprises at least six turns of antenna wire.

3. The receiver of claim 1, wherein the load impedance exceeds a sum of an impedance of the loop antenna and an impedance of the tuning network at at least one of the interrogation frequencies.

4. The receiver of claim 1, wherein the tuning network comprises first and second LC circuits, each of which includes an inductor and a capacitor electrically connected to one another in series, the first and second LC circuits electrically connected to one another in parallel to form a third LC circuit, the third LC circuit electrically connected in series with the loop antenna.

5. A logging while drilling tool comprising:
   a housing adapted to be coupled to a drill string and deployed in a subterranean borehole;
   a transmitter deployed on the housing, the transmitter disposed to transmit an electromagnetic wave into the borehole, the electromagnetic wave including a plurality of interrogation frequencies;
   first and second, longitudinally spaced loop antennas disposed to receive the electromagnetic wave, each of the loop antennas having at least a single turn of antenna wire deployed about the housing;

a tuning network electrically connected in series with the first loop antenna such that the first loop antenna and the tuning network in combination form a series-resonant circuit that series resonates at each of said plurality of interrogation frequencies a transformer having primary and secondary windings, the primary winding electrically connected in series with the loop antenna and the tuning network; and a preamplifier circuit electrically connected to the secondary winding of the transformer, the preamplifier circuit and the transformer disposed to present a load impedance to the tuning network and the first loop antenna, the load impedance being sufficiently high to reduce cross coupling from the first loop antenna to the second loop antenna to below a predetermined value at at least one of said plurality frequencies.

6. The logging while drilling tool of claim 5, wherein the load impedance exceeds a sum of an impedance of the first loop antenna and an impedance of the tuning network for each of said plurality of interrogation frequencies.

* * * * *